US012679181B2

(12) United States Patent

Lee

(10) Patent No.: US 12,679,181 B2

(45) Date of Patent: Jul. 14, 2026

(54) COUPLING APPARATUS FOR CAR DOOR

(71) Applicant: KWANGJIN CO., LTD., Asan-si (KR)

(72) Inventor: Kwan Yong Lee, Yongin-si (KR)

(73) Assignee: KWANGJIN CO., LTD., Asan-si (KR)

( * ) Notice: Subject to any disclaimer, the term of this patent is extended or adjusted under 35 U.S.C. 154(b) by 357 days.

(21) Appl. No.: 18/512,372

(22) Filed: Nov. 17, 2023

(65) Prior Publication Data

US 2024/0166033 A1 May 23, 2024

(30) Foreign Application Priority Data

Nov. 23, 2022 (KR) ........................ 10-2022-0158436

(51) Int. Cl.
B60J 5/04 (2006.01)
(52) U.S. Cl.
CPC ........... B60J 5/0416 (2013.01); B60J 5/0468 (2013.01)
(58) Field of Classification Search
CPC .............................. B60J 5/0416; B60J 5/0468
See application file for complete search history.

(56) References Cited

U.S. PATENT DOCUMENTS

| | | | |
|---|---|---|---|
| 9,920,784 B2 * | 3/2018 | Karl ...................... | F16B 39/284 |
| 10,690,257 B2 * | 6/2020 | Koukan ................ | F16K 24/044 |
| 11,919,375 B2 | 3/2024 | Choi et al. | |
| 12,012,049 B2 * | 6/2024 | Leverger ................ | B60J 5/0468 |
| 2022/0089006 A1 * | 3/2022 | Choi ...................... | B60J 5/0468 |

FOREIGN PATENT DOCUMENTS

| | | |
|---|---|---|
| JP | 5148870 B2 | 2/2013 |
| JP | 5807114 B2 | 11/2015 |
| KR | 10-2020-0117250 A | 10/2020 |
| KR | 10-2021-0015337 A | 2/2021 |

OTHER PUBLICATIONS

Lee, Kwan Yong; Coupling Apparatus For Car Door, Apr. 1, 2019, KR101964413. (Year: 2019).*
Kim, Seung Tae; "Door Checker For Vehicle", Jan. 17, 2017, KR20170006212. (Year: 2017).*
"Office Action for KR Application No. 10-2022-0158436", Jul. 24, 2024, KIPO, Korea.

* cited by examiner

*Primary Examiner* — Jonathan Malikasim
(74) *Attorney, Agent, or Firm* — Bridgeway IP Law Group, PLLC; Jihun Kim

(57) ABSTRACT

A coupling apparatus for a car door mechanically couples a first member having a first hole to a second member having a second hole at a position corresponding to the first hole. The coupling apparatus includes a stop portion configured to support the first member, a crossbar configured to support the second member and couple the second member to the first member when rotated to a final coupling position, and a shaft configured to support the stop portion and the crossbar and including a hook portion configured to hook the shaft to the first member at a temporary coupling position. The shaft is shaped to enter and rotatably pass through the first and second holes of the first and second members. The shaft is provided with an airtight member to maintain airtightness between the shaft and the first hole of the first member at the final coupling position.

4 Claims, 12 Drawing Sheets

COUPLING APPARATUS FOR CAR DOOR

CROSS-REFERENCE TO RELATED APPLICATION

This application is based on and claims priority under 35 U.S.C. § 119 to Korean Patent Application No. 10-2022-0158436, filed on Nov. 23, 2022, in the Korean Intellectual Property Office, the disclosure of which is incorporated by reference herein in its entirety.

BACKGROUND

1. Field

The disclosure relates to a coupling apparatus for a car door, and more particularly, to a coupling apparatus for mechanically coupling first and second members of a car door to each other in a secure and airtight manner.

2. Description of the Related Art

In recent automobile assembly processes, there is an increasing trend toward modularization that involves assembling unit parts together to reduce the use of assembly lines and improve workability, and thus, to improve productivity. In line with the modularization trend, doors are assembled by assembling door window regulators, door latches, and door inner handles on module panels, and then, coupling the module panels to inner panels of the doors.

For example, as shown in FIGS. 1 and 2, a module panel 10 is configured to be coupled to an inner panel 31 of a door body 30.

The module panel 10 is formed in one piece by using a synthetic resin material such as glass fiber reinforced polypropylene (PP), and may be fixed to the inner panel 31 such that an assembly opening formed in a center portion of the inner panel 31 may be closed by the module panel 10.

The module panel 10 includes a flange portion 2 configured to be fixed to an edge of the assembly opening, and a curved portion 3 surrounded by the flange portion 2 and having an inner three-dimensional shape. The flange portion 2 includes a plurality of installation holes 4 for coupling with the inner panel 31. Various components such as a window regulator and a speaker may be installed on the curved portion 3.

The module panel 10 may be coupled to the inner panel 31 by inserting a plurality of bolts 27 into the installation holes 4 and then tightening the bolts 270 using a tool such as a spanner.

The assembling method using bolts requires a plurality of nuts joined (generally, welded) to the inner panel 31 and a plurality of bolts for coupling with the nuts, thereby increasing the weight and unit cost of a door.

PRIOR DOCUMENT

Patent Document

Japanese Registered Patent No. 5148870 (published on Feb. 20, 2013)

SUMMARY

Provided is a coupling apparatus for a car door, the coupling apparatus being configured to improve fuel efficiency by reducing weight and incur low costs by reducing the number of parts.

Additional aspects will be set forth in part in the description which follows and, in part, will be apparent from the description, or may be learned by practice of the presented embodiments of the disclosure.

According to an aspect of the disclosure, a coupling apparatus for a car door includes a first member including a first hole, a second member including a second hole at a position corresponding to the first hole, and a coupler configured to mechanically couple the first member and the second member to each other, wherein a first latch projection is formed on an inner peripheral surface of the first hole of the first member, wherein the coupler includes a shaft, a stop portion, a crossbar, and a position maintaining portion. The shaft extends in a vertical direction and has a shape for entering and rotatably passing through the first hole of the first member and the second hole of the second member. The stop portion is provided on a side of the shaft and configured to support the first member. The crossbar is provided on another side of the shaft and configured such that when the shaft is rotated to a final coupling position, the crossbar supports the second member and fixedly couples the second member to the first member. The position maintaining portion includes a groove portion and a separation prevention protrusion. The groove portion is provided on an outer side of the shaft and forms a movement path along which the first latch projection moves. The separation prevention protrusion is provided on the groove portion and prevents the first latch projection in the movement path from being separated from the shaft. The first latch projection is provided on the first member in an elastically movable manner such that when the first latch projection passes the separation prevention protrusion while coming into contact with the separation prevention protrusion, the first latch projection elastically moves in a direction away from the separation prevention protrusion.

In the coupling apparatus, a buffer space may be formed in the first member around the first hole by a through-hole penetrating the first member in the vertical direction, and when the first latch projection passes the separation prevention protrusion, the first latch projection may be moved toward the buffer space.

In the coupling apparatus, an elastic support may be provided between the first hole and the buffer space, and the first latch projection may protrude from a center lateral surface of the elastic support.

In the coupling apparatus, the elastic support may extend in a wave shape in which a convex portion relatively close to the shaft and a concave portion relatively distant from the shaft are alternately formed.

In the coupling apparatus, a second latch projection may be formed in the first hole of the first member at a position at which the second latch projection makes a right angle with the first latch projection, an inclined lateral surface may be formed on each of both sides of the crossbar, and the second latch projection may make contact with the inclined lateral surface of the crossbar to prevent the crossbar inserted into the first hole from moving in a direction opposite to a direction in which the crossbar is inserted into the first hole.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
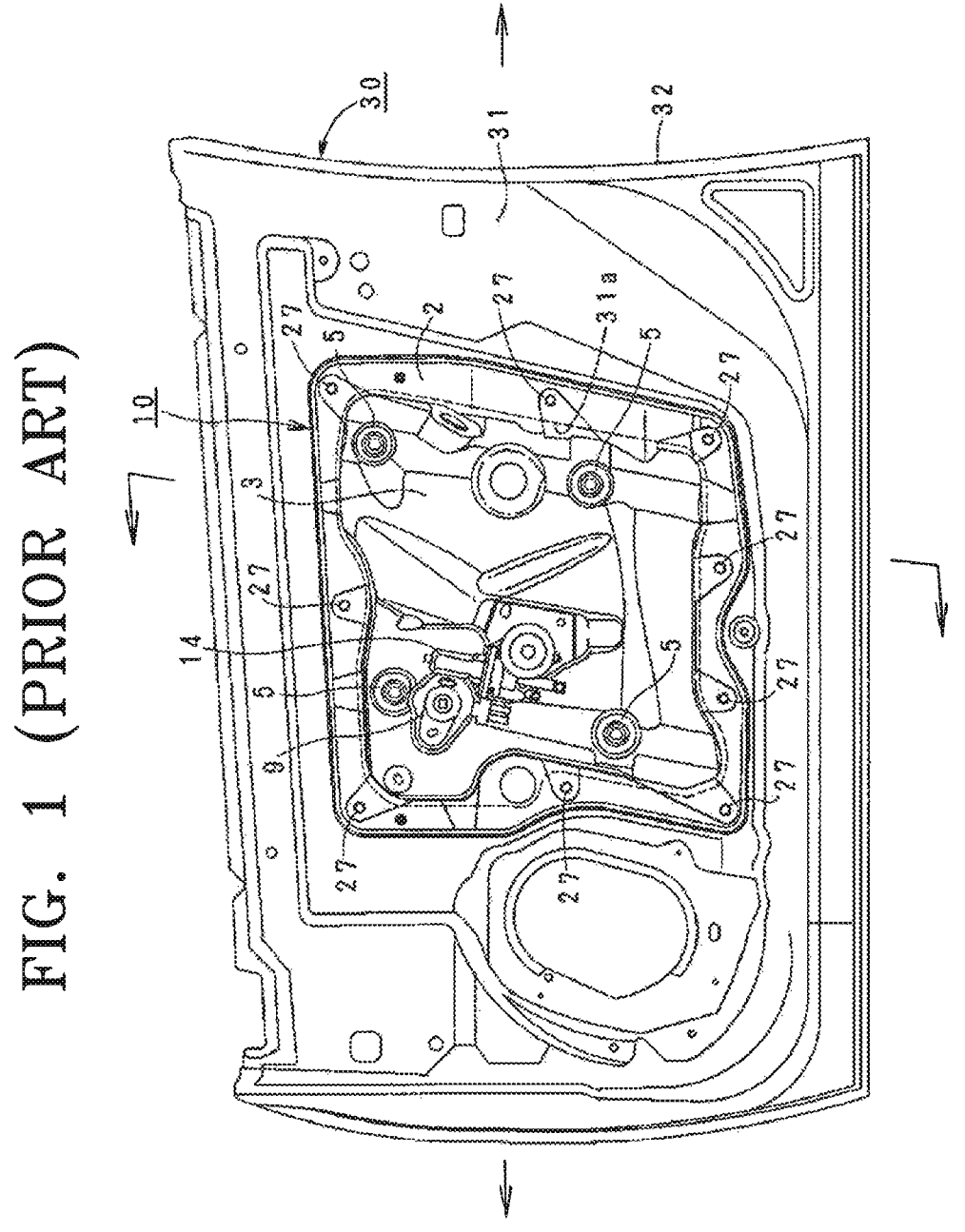
FIG. 1 is a view illustrating a side of a cart door of the related art.
Figure 2:
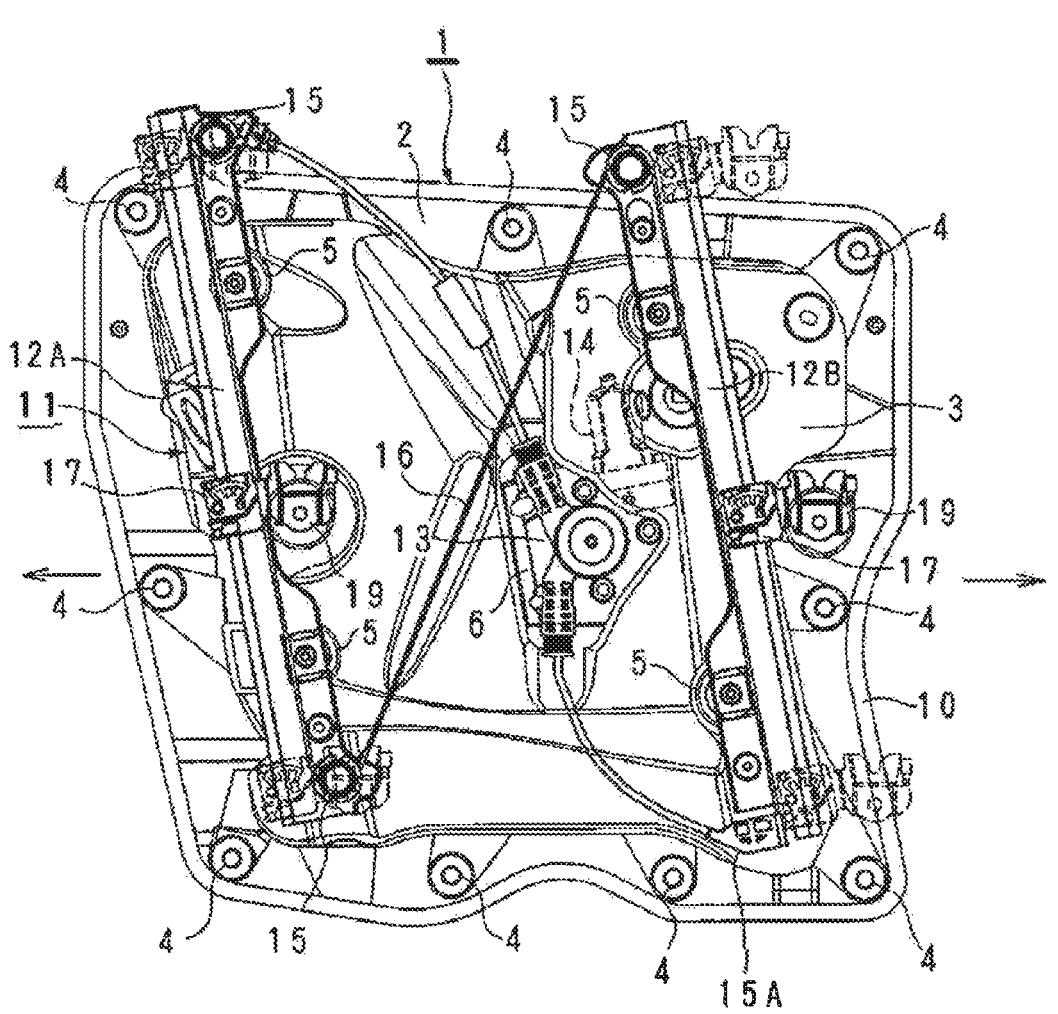
FIG. 2 is a view illustrating a side of a module panel of the car door shown in FIG. 1.
Figure 3:
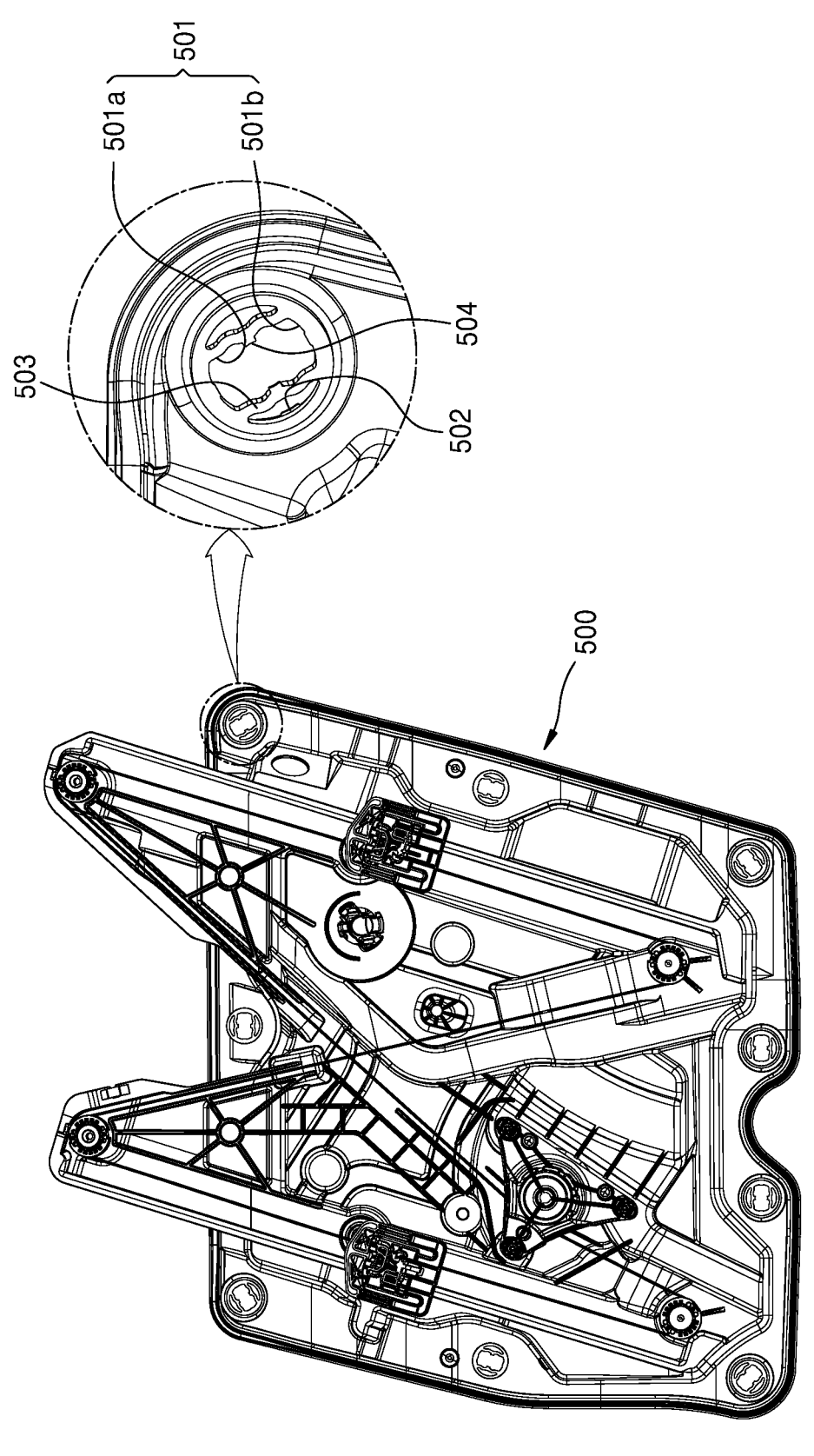
FIG. 3 is a view illustrating a side of a module panel for a car door according to an embodiment.
Figure 4:
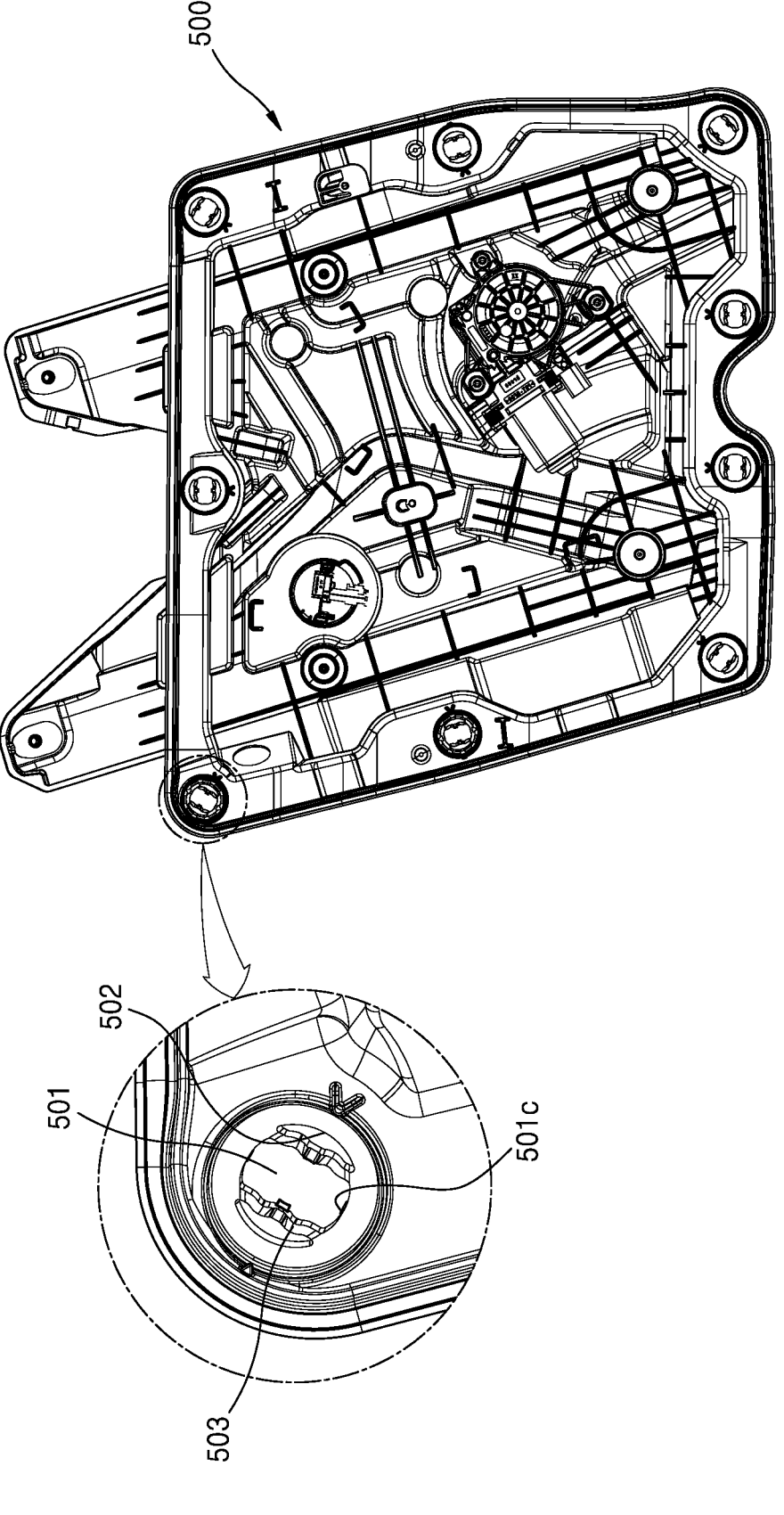
FIG. 4 is a view illustrating another side of the module panel shown in FIG. 3.
Figure 5:
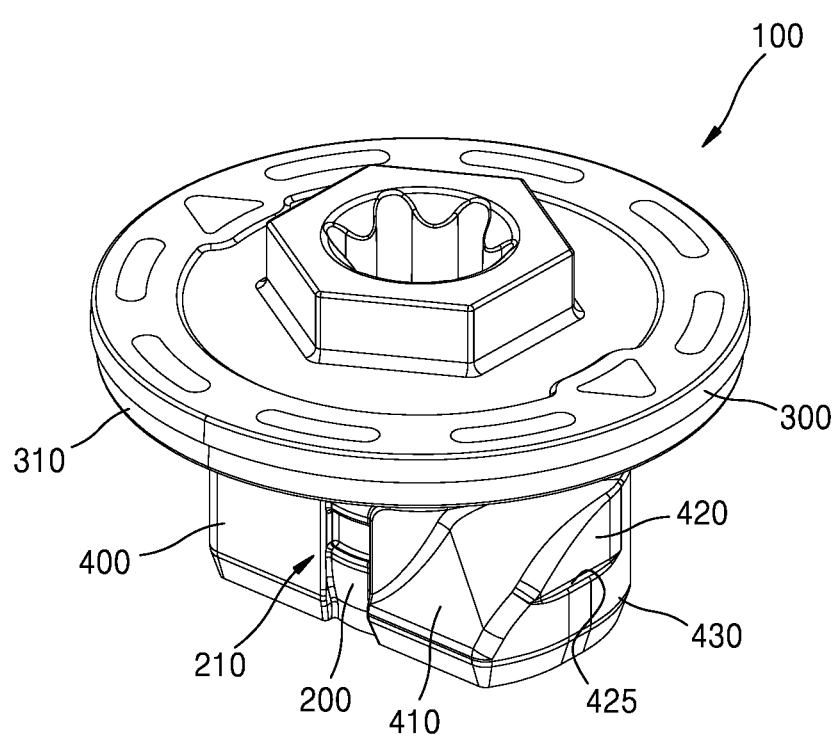
FIG. 5 is a perspective view illustrating an upper side of a coupler of a coupling apparatus for a car door according to an embodiment.
Figure 6:
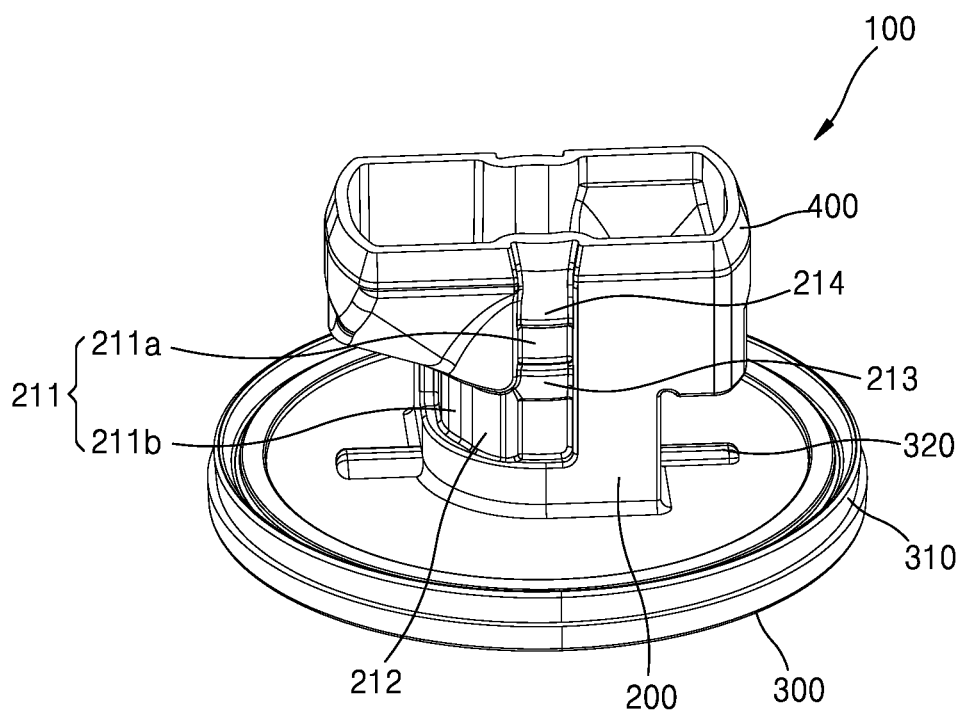
FIG. 6 is a perspective view illustrating a lower side of the coupler shown in FIG. 5.
Figure 7:
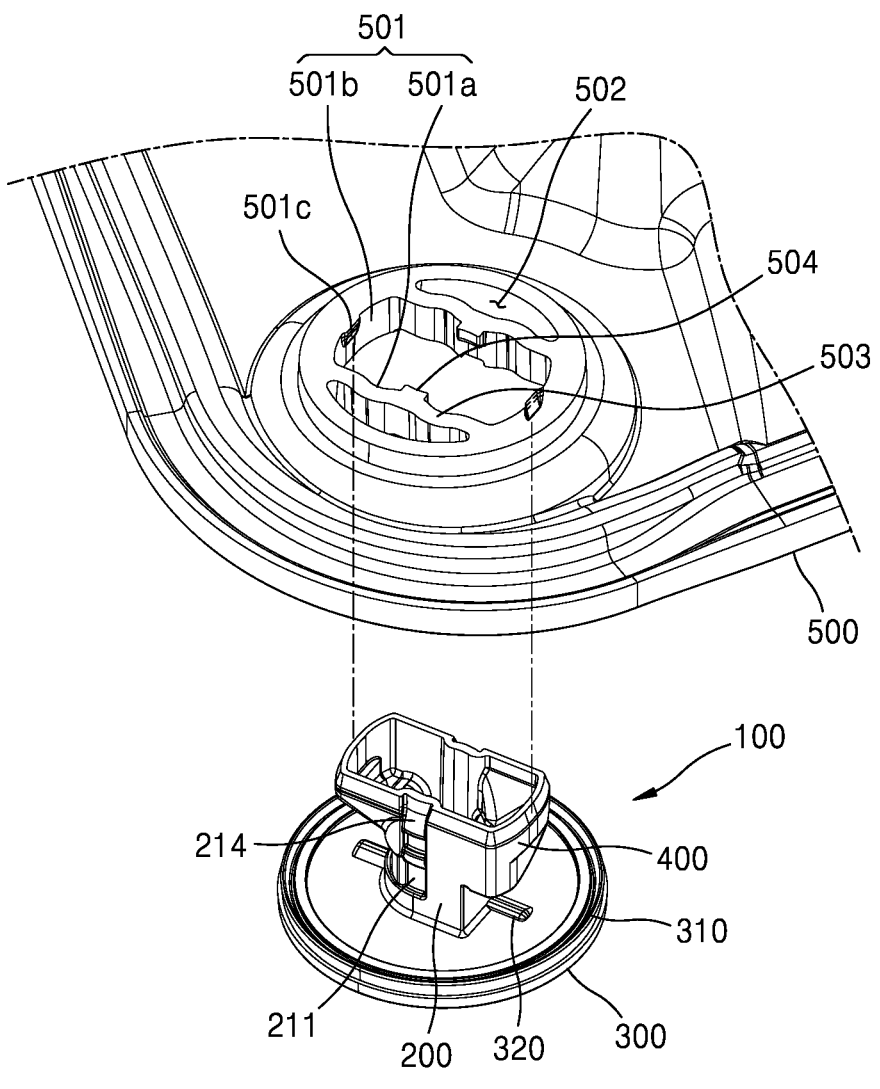
FIG. 7 is a perspective view illustrating a state in which the coupler is not yet coupled to the module panel according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a coupling apparatus for a car door will be described according to embodiments with reference to the accompanying drawings.

Embodiments are for illustrating the technical idea of the disclosure. The scope of the disclosure is not limited to the embodiments presented below or detailed descriptions of the embodiments.

"Embodiments" are arbitrary divisions for easily describing the technical idea of the disclosure and are not exclusive of each other. For example, configurations disclosed in an embodiment may be applied to and implemented in other embodiments, and may be applied and implemented with changes without departing from the scope of the disclosure.

Unless defined otherwise, all terms used herein, including technical and scientific terms, have the same meaning as those commonly understood by a person skilled in the art to which the disclosure pertains. All terms used in the disclosure are selected for the purpose of describing the disclosure more clearly, and are not selected to limit the scope of the disclosure.

Terms such as "comprising," "including," or "having" used in the disclosure should be understood as open-ended terms that imply the possibility of including other embodiments, unless otherwise stated in the phrase or sentence in which the terms are used.

Terms such as "comprising only," "including only," or "having only" used in the disclosure should be understood as closed-ended terms that exclude the possibility of including other elements.

As used herein, the singular forms "a," "an," and "the" are intended to include the plural forms as well, unless otherwise state, and the same applies to the claims.

Terms such as "first" and "second" are used herein to distinguish various elements from each other without considering the order or importance of the elements.

In the disclosure, a "first member" may refer to a module panel configured to be detachably installed on an inner panel of a door, but is not limited thereto. For example, the first member may refer to the inner panel. In addition, the module panel may be typically formed through an injection molding process using a plastic material, but is not limited thereto. For example, the module panel may include various materials such as a metal.

Embodiments will now be described with reference to the accompanying drawings. In the drawings, like reference numerals denote like elements. In the following descriptions of the embodiments, overlapping descriptions of like elements may be omitted. However, even when a description of such an element is omitted, it is not intended that the element is excluded from some embodiments.

According to an embodiment, a coupling apparatus 1 for a car door may include a first member 500 having a first hole 501, a second member 600 having a second hole 601, and a coupler 100 configured to mechanically couple the first member 500 and the second member 600 to each other.

The first member 500 includes the first hole 501 and may correspond to a module panel. Electrical components required for the car door may be modularized and installed on the module panel. Components such as a window regulator or a speaker may be installed on the module panel. After such electrical components are installed on the module panel, the module panel may be attached to an inner panel of the car door.

The first member 500 may include: the first hole 501 through which a shaft 200 penetrates; a buffer space 502 provided around the first hole 501; and an elastic support 503 provided between the first hole 501 and the buffer space 502.

The first hole 501 has a long hole shape extending in one direction and corresponding to a cross-sectional shape of the coupler 100. For example, the first hole 501 includes a first portion 501a that is narrow and extends in one direction, and a second portion 501b formed on each of both sides of the first portion 501a. The first portion 501a and the second portion 501b cooperate to form the first hole 501 therein.

A second latch projection 501c is formed on the second portion 501b of the first hole 501 at a position at which the second latch projection 501c makes a right angle with a first latch projection 504. For example, the second latch projection 501c formed on the second portion 501b having a narrow width is configured to make contact with a lateral surface of a crossbar 400. The second latch projection 501c making contact with the lateral surface (inclined surface) of the crossbar 400 causes the first latch projection 504 to make contact with a separation prevention protrusion 214 of the shaft 200 at a temporary coupling position. In addition, the second latch projection 501c may maintain a state in which a rear surface of the crossbar 400 partially protrudes from the second member 600.

The buffer space 502 is formed in each of both sides of the first portion 501a extending in the first hole 501, and the buffer space 502 and the first hole 501 together form a circular shape as a whole. For example, the buffer space 502 is formed around the first hole 501 by a through-hole penetrating the first member 500 in a vertical direction. A pair of buffer spaces 502 may be formed on both sides of the first hole 501 and may each function as a space in which the elastic support 503 is elastically deformed.

The elastic support 503 is formed between the first hole 501 and the buffer space 502 and separate the first hole 501 and the buffer space 502 from each other. The elastic support 503 has a thin bar shape, and the first latch projection 504 protruding toward a center portion of the first hole 510 is formed on a center portion of the elastic support 503.

When the first latch projection 504 passes the separation prevention protrusion 214 while coming into contact with the separation prevention protrusion 214, the elastic support 503 elastically moves into the buffer space 502 to allow the first latch projection 504 easily passes the separation prevention protrusion 214.

As a whole, the elastic support 503 have a wave shape in which a convex portion relatively close to the shaft 200 and a concave portion relatively distant from the shaft 200 are alternately formed. For example, the convex portion has a convex shape approaching the center portion of the first hole 501, and the concave portion has a concave shape recessed away from the center portion of the first hole 501.

The convex portion and the concave portion are alternately formed in a length direction of the elastic support 503, for example, on a two-dimensional plane.

Because the elastic support 503 has a wave shape including the convex and concave portions, the elasticity and durability of the elastic support 503 may be improved.

In addition, even when the size of the shaft 200 and the size of the first hole 501 do not match precisely, the elastic support 503 having a wave shape may be easily deformed according to the shape of the shaft 200. However, the shape of the elastic support 503 is not limited to the wave shape, and the elastic support 503 may have various shapes such as a straight line shape, an arc shape, or an angled shape.

In addition, the elastic support 503 is not limited to having a two-dimensional wave shape and may have a three-dimensional wave shape. That is, convex and concave portions may be arranged in both horizontal and vertical directions.

The second member 600 may be an inner panel of the car door, and the second hole 601 of the second member 600 may be formed at a position corresponding to the first hole 501 of the first member 500. This second hole 601 may have a long hole shape roughly corresponding to the crossbar 400.

The coupler 100 includes the shaft 200, a stop portion 300, and the crossbar 400.

The shaft 200 is shaped such that the shaft 200 may be inserted into the first hole 501 of the first member 500 and the second hole 601 of the second member 600 and may rotatably pass the first hole 501 of the first member 500 and the second hole 601 of the second member 600. The shaft 200 may have a pillar shape extending in the vertical direction. The stop portion 300 may be provided on an upper end of the shaft 200, and the crossbar 400 may be provided on a lower end of the shaft 200.

The shaft 200 may include a position maintaining portion 210. Owing to the position maintaining portion 210, the shaft 200 may be temporarily coupled to the first member 500 in a state in which the shaft 200 is vertically movable without separation from the first member 500 at the temporary coupling position (shown in FIGS. 4 to 11).

At the temporary coupling position, the rear surface of the crossbar 400 remains partially protruding from the second member 600.

For example, the position maintaining portion 210 may be provided on an outer side of the shaft 200 and may include a groove portion 211 configured to guide the first latch projection 504.

The groove portion 211 may include: a vertical groove portion 211a extending vertically toward an end of the shaft 200 from the other end of the shaft 200 and configured to receive and guide the first latch projection 504; and a horizontal groove portion 211b extending horizontally from an end of the vertical groove portion 211a and allowing the shaft 200 to rotate.

The vertical groove portion 211a may include a retaining protrusion 213 configured to prevent the first latch projection 504 of the first hole 501 from entering the horizontal groove portion 211b at the temporary coupling position. For example, the retaining protrusion 213 may be provided near a portion connecting the vertical groove portion 211a and the horizontal groove portion 211b to each other.

The separation prevention protrusion 214 may be provided on an upper entrance of the vertical groove portion 211a. Once the first latch projection 504 passes the separation prevention protrusion 214 and enters the vertical groove portion 211a, the first latch projection 504 may not be separated from the groove portion 211 owing to the separation prevention protrusion 214 having a stepped shape. To this end, the separation prevention protrusion 214 may have a stepped shape gradually sloping in a direction from the other end of the shaft 200 toward the end of the shaft 200 and then making a right angle with the end of the shaft 200.

The first latch projection 504 may move downward in the vertical direction along the vertical groove portion 211a and may then rotate into the horizontal groove portion 211b, thereby reaching a final coupling position.

For example, when the shaft 200 enters the first hole 501 of the first member 500, the first latch projection 504 of the first member 500 passes the separation prevention protrusion 214 and enters the vertical groove portion 211a. At this time, the vertical groove portion 211a prevents the shaft 200 from rotating relative to the first member 500 by suppressing the first latch projection 504 from moving left and right.

That is, the vertical groove portion 211a may be a groove that is recessed into the shaft and deeply concave in the vertical direction. Therefore, after the first latch projection 504 is inserted into the vertical groove portion 211a, the first latch projection 504 is guide to be movable only in the vertical direction.

In addition, after the first latch projection 504 enters the vertical groove portion 211a, the position of the first latch projection 504 is maintained between the retaining protrusion 213 and the separation prevention protrusion 214 unless additional pressing force is applied to the first latch projection 504, and thus the first latch projection 504 may maintain a certain height at the temporary coupling position.

For example, at the temporary coupling position, the crossbar 400 of the shaft 200 is freely movable in an axial direction by about 3 mm to 6.5 mm from a rear surface of the first member 500 such that the first member 500 may be moved toward the second member 600 without interference such as collision with other objects.

The horizontal groove portion 211b may include a rotation suppressing protrusion 212 to suppress rotation of the shaft 200, and thus, after the shaft 200 enters the horizontal groove portion 211b, the shaft 200 may not rotate unless a force greater than or equal to a certain value is applied to the shaft 200. The rotation suppressing protrusion 212 may be formed at or around an entrance of the horizontal groove portion 211*b*.

For example, when the shaft 200 is freely rotatable after the first latch projection 504 is vertically lowered along the vertical groove portion 211*a* in a rotation-suppressed state and is then inserted into the horizontal groove portion 211*b*, the second member 600 may be fixed to the first member 500 due to an unintentional rotation of the shaft 200. To prevent this, the rotation suppressing protrusion 212 is provided. The shaft 200 is not rotated unless a force sufficient to overcome the rotation suppressing protrusion 212 is applied to the shaft 200.

The stop portion 300 may be provided on a side of the shaft 200 for supporting the first member 500. The stop portion 300 may be provided on an upper side of the shaft 200. The stop portion 300 may have a disk shape with a larger cross-sectional area than the first hole 501 and the second hole 601. A rear surface of the stop portion 300 may be configured to press the first member 500 in contact with an upper surface of the first member 500 at the final coupling position.

For example, the rear surface of the stop portion 300 may be configured to support the first member 500 by making contact with the upper surface of the first member 500.

A sealing material 310 may be provided on the rear surface of the stop portion 300 that faces the first member 500, thereby ensuring watertightness when the stop portion 300 is in contact with the first member 500. For example, the sealing material 310 may be a ring-shaped rubber material configured to seal an area around the first hole 501 of the first member 500 for watertightness.

In addition, the stop portion 300 may include a loosening prevention portion 320 to prevent the shaft 200 from loosening when the shaft 200 rotates to the final coupling position. The loosening prevention portion 320 may be a protrusion protruding from the rear surface of the stop portion 300 and configured to be seated in a loosening prevention groove (not shown) of the first member 500. When the shaft 200 is rotated to the final coupling position (shown in FIG. 12), the loosening prevention portion 320 may be inserted into the loosening prevention groove (not shown) of the first member 500, thereby fixing the shaft 200 to the final coupling position.

The crossbar 400 may be provided on the other side of the shaft 200. The crossbar 400 may be configured to support the second member 600 and fixedly couple the second member 600 to the first member 500 when the shaft 200 is rotated to the final coupling position. The crossbar 400 may be provided on the lower end of the shaft 200. The crossbar 400 may extend left and right and may thus have a bar shape as a whole.

An inclined surface 410 may be formed on an upper surface of the crossbar 400 to reduce a gap between the first member 500 and the second member 600 when the shaft 200 rotates in one direction. That is, when the shaft 200 rotates, the gap between the first member 500 and the second member 600 may reduce along the inclined surface 410. Owing to the inclined surface 410, the thickness of the crossbar 400 may gradually increase. The crossbar 400 does not protrude from the rear surface of the first member 500 facing the second member 600 at the temporary coupling position, and thus, when the second member 600 is coupled to the first member 500 while the second member 600 is brought into contact with the rear surface of the first member 50, the crossbar 400 may not be caught on the second member 600.

A lateral surface of the crossbar 400 may include: an inclined lateral surface 420 having an outer diameter that increases in a direction away from the stop portion 300; and a first lateral surface 430 having a diameter that is substantially constant from the inclined lateral surface 420 to an end of the first lateral surface 430. A step 425 may be formed between the inclined lateral surface 420 and the first lateral surface 430, and the second latch projection 501*c* may be configured to be caught on the step 425.

When the second latch projection 501*c* is in contact with the inclined lateral surface 420 of the crossbar 400, the crossbar 400 inserted in the first hole 501 may be prevented from moving in the opposite direction of insertion.

When the shaft 200 is inserted into the first hole 501, the first latch projection 504 of the first member 500 may be caught on the separation prevention protrusion 214 of the coupler 100, and the second latch projection 501*c* of the first member 500 may be caught on the step 425 of the crossbar 400. In this case, the coupler 100 is supported on both the first latch projection 504 and the second latch projection 501*c* of the first hole 501, and thus, during a transport process, the coupler 100 inserted into the first member 500 may not swing left or right or may not be separated from the first member 500.

The coupling apparatus 1 for a car door is described below according to embodiments with reference to the accompanying drawings.

According to an embodiment, when the shaft 200 and the first member 500 are transferred to a door side in a state in which the shaft 200 is temporarily coupled to the first member 500, it is possible to prevent the shaft 200 from departing from the first member 500 by using a simple structure.

Figure 8:
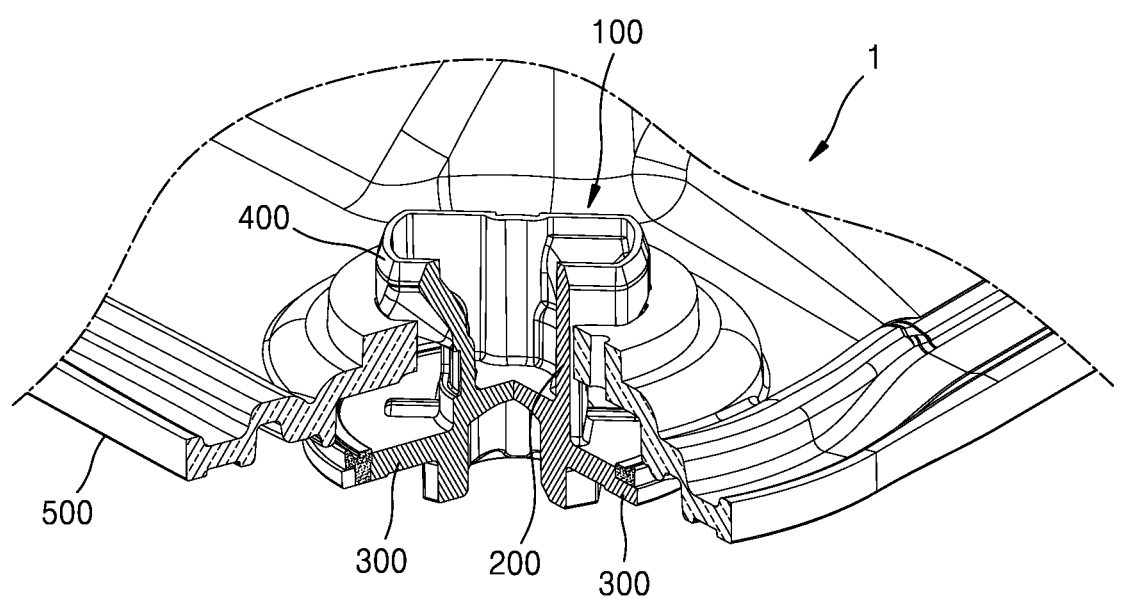
FIG. 8 is a cutaway view illustrating a state in which the module panel and the coupler are coupled to each other at a temporary coupling position.
Figure 9:
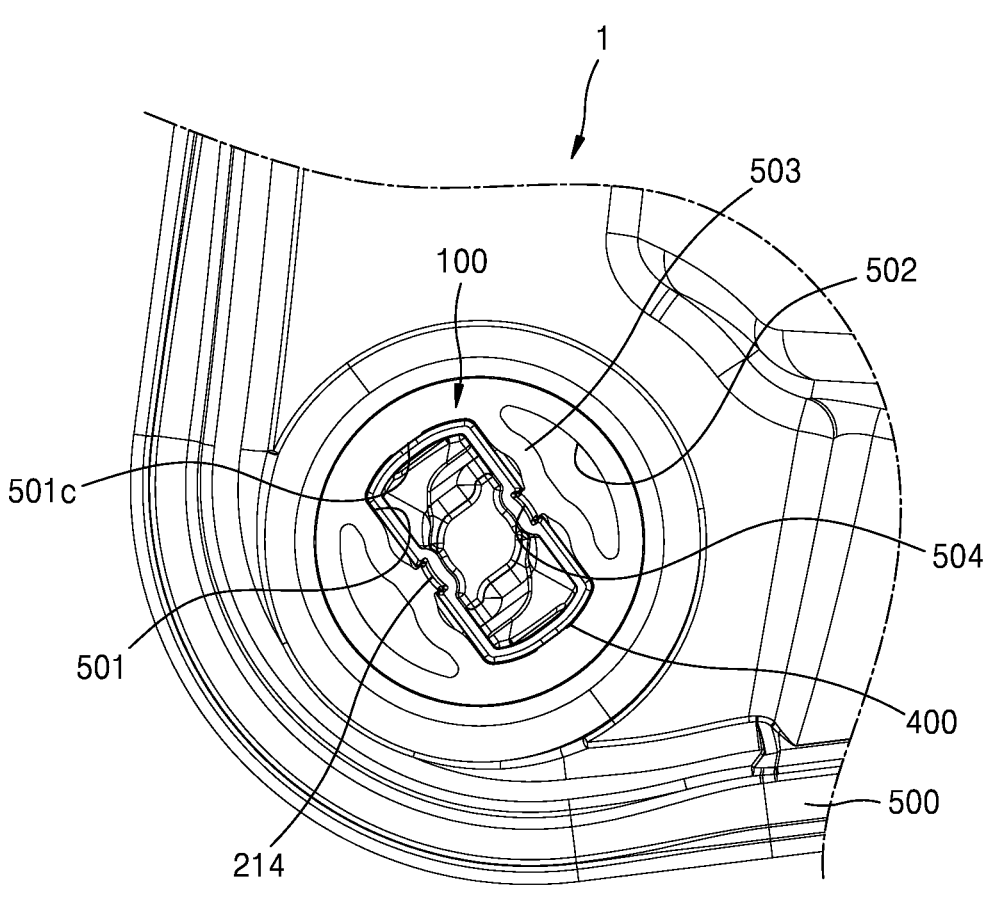
FIG. 9 is a plan view illustrating the state shown in FIG. 8.

For example, as shown in FIGS. 8 and 9, in a temporary coupling state for transportation, the crossbar 400 is disposed in the first member 500 with an end of the crossbar 400 protruding only about 3 mm, and thus, when the first member 500 is moved toward the second member 600, the shaft 200 may not act as an obstacle.

In addition, because the crossbar 400 slightly protrudes, the crossbar 400 may be easily seated on the second member 600 when the first member 500 is moved. That is, the crossbar 400 protruding about 3 mm from the rear surface of the first member 500 may facilitate alignment without acting as an obstacle in the process of moving the second member 600.

Figure 10:
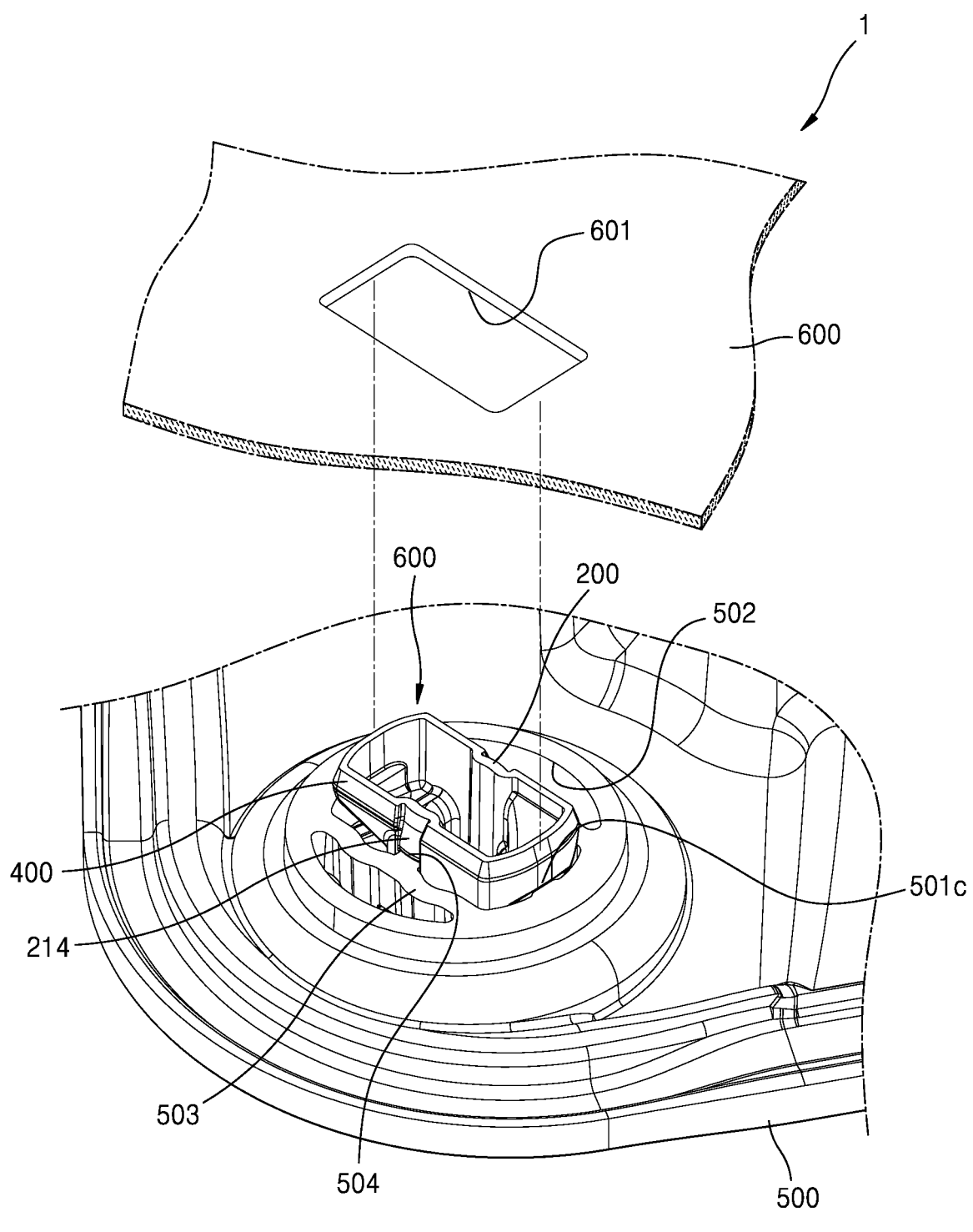
FIG. 10 is a perspective view illustrating a state in which the coupler is not yet coupled to an inner panel according to an embodiment.

After a worker moves the first member 500 to a door side, the worker may align the coupler 100 with the second hole 601 of the second member 600 as shown in FIG. 10. Thereafter, the shaft 200 of the coupler 100 may be inserted into the second hole 601 of the second member 600.

Figure 11:
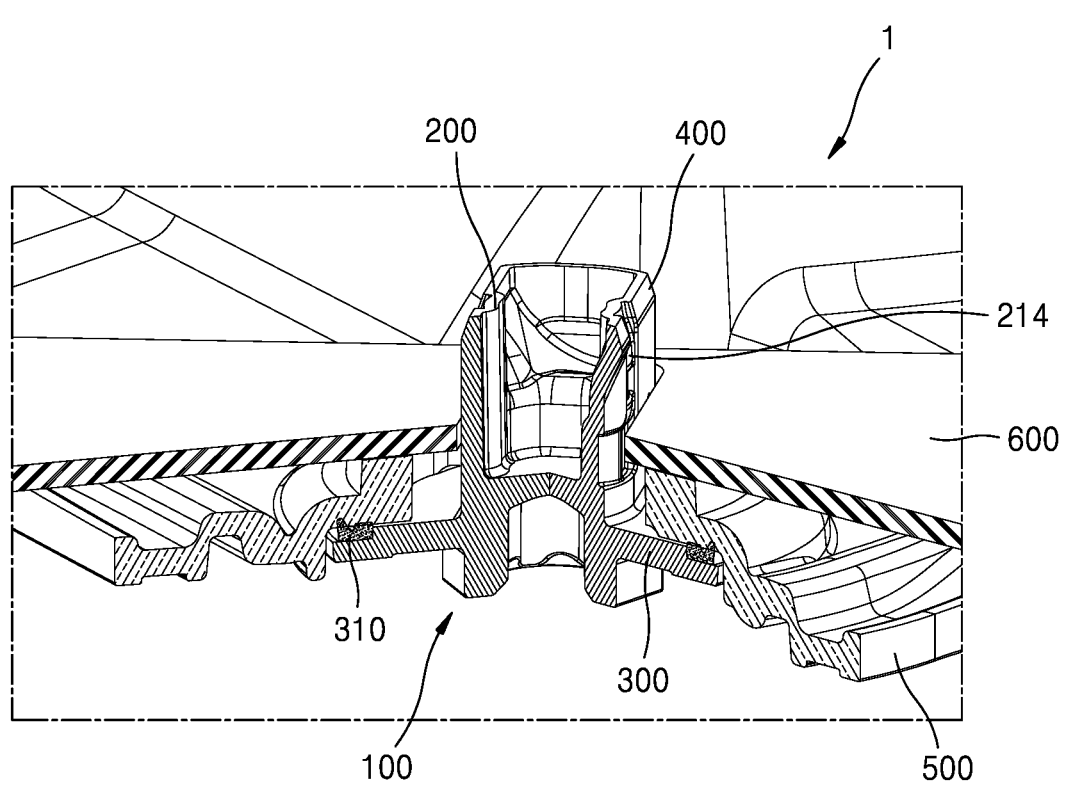
FIG. 11 is a view illustrating a state in which the coupler is coupled to the inner panel.

Then, the crossbar 400 may be additionally lowered to place the first latch projection 504 on a lowermost end of the vertical groove portion 211*a*. At this time, as shown in FIG. 11, the rear surface of the stop portion 300 of the coupler 100 is brought into tight contact with the first member 500.

Figure 12:
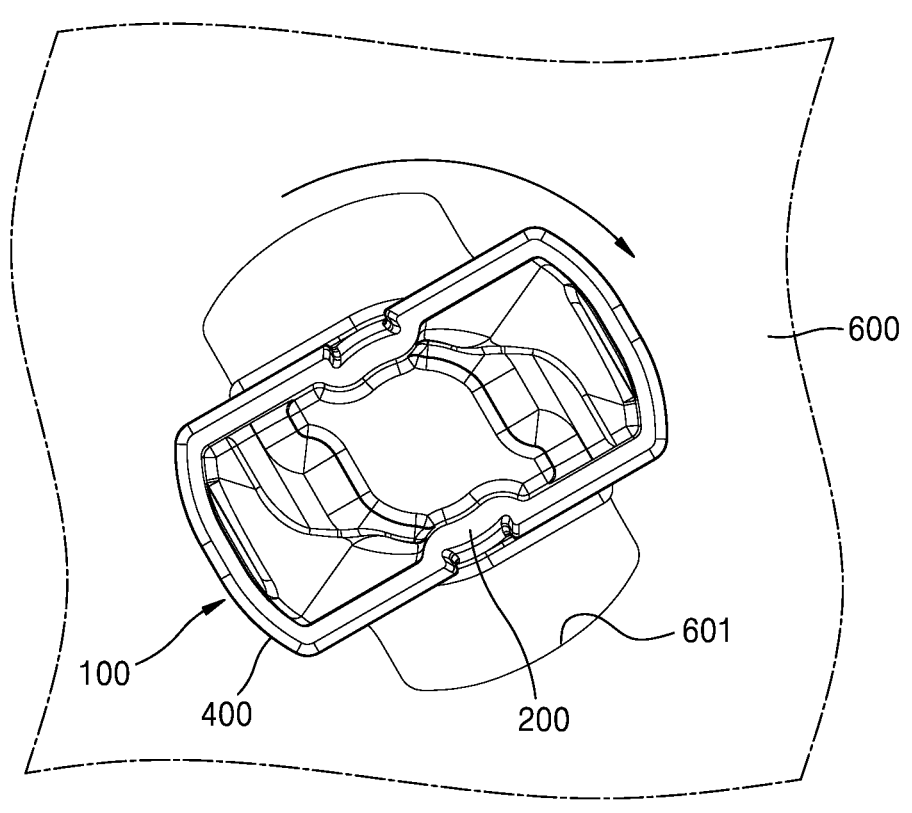
FIG. 12 is a view illustrating a state in which the coupler is rotated to a final coupling position.

Thereafter, the coupler 100 may be rotated to the final coupling position as shown in FIG. 12. For example, when the shaft 200 is rotated 90° or more, the stop portion 300 may support the first member 500, the upper surface of the crossbar 400 may support a lower surface of the second member 600, and the first member 500 and the second member 600 may be clamped to each other At this time, the first member 500 and the second member 600 may be securely coupled to each other in a state in which the stop portion 300 supports the first member 500, and the crossbar 400 supports the second member 600. In addition, the loosening prevention portion 320 may prevent the shaft 200 from rotating in the opposite direction, and thus, the clamping between the first member 500 and the second member 600 may not be loosened.

In addition, because the sealing material 310 of the stop portion 300 is in tight contact with a surface of the first member 500, water may not penetrate between the first member 500 and the stop portion 300, and an inner space of the car door may be reliably watertight.

According to embodiments, the coupling apparatus 1 for a car door may have the following effects.

The coupling apparatus 1 for a car door does not require the attachment (normally welding) of nuts to a door panel and the use of additional bolts that are required in the related art, but uses the coupler 100 previously attached to a module panel, thereby reducing weight and costs.

A door module panel (the first member 500) and a door inner panel (the second member 600) may be easily coupled to each other using the coupling apparatus 1 by simply fixedly inserting the coupling apparatus 1 into the door inner panel in a state in which the coupling apparatus 1 is temporarily inserted in the door module panel.

In addition, according to embodiments, the coupling apparatus 1 is configured such that when the coupler 100 is inserted into the first hole 501, the first latch projection 504 may be caught on the separation prevention protrusion 214 while elastically deforming in a direction away from the separation prevention protrusion 214. Thus, the coupler 100 may be easily inserted without damaging the first latch projection 504, the first member 500, or the separation prevention protrusion 214.

In addition, the second latch projection 501c is formed on the first member 500 at a position at which the second latch projection 501c makes a right angle with the first latch projection 504 and is configured to be caught on the step 425 of the crossbar 400. Therefore, the shaft 200 may not swing left, right, forward, and backward at the temporary coupling position, thereby preventing the coupler 100 from separating from the first member 500.

As described above, according to the one or more of the above embodiments, the coupling apparatus 1 for a car door may be assembled using only a turn clip structure instead of using nuts and bolts together and may thus be lightweight and inexpensive compared with coupling apparatuses of the related art.

In addition, a module panel and an inner panel may be easily coupled to each other using the coupling apparatus 1 by simply fixedly inserting the coupling apparatus 1 into the inner panel in a state in which the coupling apparatus 1 is temporarily coupled to the door module panel.

Furthermore, according to embodiments, in the coupling apparatus 1 for a car door, the first latch projection 504 is deformably provided on the first member 500 such that when the first latch projection 504 passes the retaining protrusion 213 while coming into contact with the retaining protrusion 213, the first latch projection 504 may be elastically moved away from the retaining protrusion 213. As a result, the coupling apparatus 1 may be easily installed without being damaged.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A coupling apparatus for a car door, the coupling apparatus comprising:
a first member comprising a first hole;
a second member comprising a second hole at a position corresponding to the first hole; and
a coupler configured to mechanically couple the first member and the second member to each other,
wherein a first latch projection is defined on an inner peripheral surface of the first hole of the first member,
wherein the coupler comprises:
a shaft extending in a vertical direction and having a shape for entering and rotatably passing through the first hole of the first member and the second hole of the second member;
a stop portion disposed on a side of the shaft and configured to support the first member;
a crossbar disposed on another side of the shaft and configured such that when the shaft is rotated to a final coupling position, the crossbar supports the second member and fixedly couples the second member to the first member; and
a position maintaining portion comprising a groove portion and a separation prevention protrusion, the groove portion being disposed on an outer side of the shaft and configured to define a movement path along which the first latch projection moves, and the separation prevention protrusion being disposed on the groove portion and configured to prevent the first latch projection in the movement path from being separated from the shaft,
wherein the first latch projection is disposed on the first member in an elastically movable manner such that when the first latch projection passes the separation prevention protrusion while coming into contact with the separation prevention protrusion, the first latch projection elastically moves in a direction away from the separation prevention protrusion, and
wherein a buffer space is defined in the first member around the first hole by a through-hole penetrating the first member in the vertical direction, and
wherein when the first latch projection passes the separation prevention protrusion, the first latch projection is moved toward the buffer space.

2. The coupling apparatus of claim 1, wherein an elastic support is disposed between the first hole and the buffer space, and the first latch projection protrudes from a center lateral surface of the elastic support.

3. The coupling apparatus of claim 2, wherein the elastic support extends in a wave shape in which a convex portion relatively close to the shaft and a concave portion relatively distant from the shaft are alternately defined.

4. The coupling apparatus of claim 1, wherein a second latch projection is defined in the first hole of the first member at a position where the second latch projection makes a right angle with the first latch projection,
an inclined lateral surface is defined on each of both sides of the crossbar, and
the second latch projection makes contact with the inclined lateral surface of the crossbar to prevent the crossbar inserted into the first hole from moving in a direction opposite to a direction in which the crossbar is inserted into the first hole.

* * * * *